United States Patent
Goel et al.

(10) Patent No.: US 7,359,951 B2
(45) Date of Patent: Apr. 15, 2008

(54) DISPLAYING SEARCH RESULTS

(75) Inventors: Surendra Goel, Falls Church, VA (US);
David E. Kellum, Arlington, VA (US);
Thomas E. Donaldson, Falls Church, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 867 days.

(21) Appl. No.: 09/749,627

(22) Filed: Dec. 28, 2000

(65) Prior Publication Data
US 2002/0103797 A1 Aug. 1, 2002

Related U.S. Application Data

(60) Provisional application No. 60/223,695, filed on Aug. 8, 2000.

(51) Int. Cl.
*G06F 15/16* (2006.01)
(52) U.S. Cl. .................................. 709/217; 709/219
(58) Field of Classification Search ................ 709/219, 709/216, 201, 217; 715/968, 501.1; 707/3, 707/4, 5
See application file for complete search history.

(56) References Cited

U.S. PATENT DOCUMENTS

| | | |
|---|---|---|
| 5,694,523 A | 12/1997 | Wical |
| 5,826,261 A * | 10/1998 | Spencer ..................... 707/5 |
| 5,877,759 A | 3/1999 | Bauer |
| 5,878,219 A | 3/1999 | Vance, Jr. et al. |
| 5,895,465 A | 4/1999 | Guha |
| 5,913,214 A | 6/1999 | Madnick et al. |
| 5,924,090 A | 7/1999 | Krellenstein |
| 5,933,827 A | 8/1999 | Cole et al. |

(Continued)

FOREIGN PATENT DOCUMENTS

EP 0827063 A 3/1998

(Continued)

OTHER PUBLICATIONS

S. Alaoui-Mounir et al., *Fusion of Information Retrieval Engines (FIRE)*. Paper presented at the International Conference on Parallel and Distributed Processing Technologies and Applications (PDPTA-1998), Las Vegas, NV (1998).

(Continued)

*Primary Examiner*—William Vaughn
*Assistant Examiner*—Kristie Shingles
(74) *Attorney, Agent, or Firm*—Fish & Richardson P.C.

(57) ABSTRACT

Website search results obtained from searching multiple electronic information stores may be displayed transparently without distinguishing the electronic information store. The search may be performed by a web host and may include receiving at least one search term that then is compared with first electronic information within a first electronic information store to determine whether matches exist, where the first electronic information includes content provided by an internal source. The search term also is compared with second electronic information within a second electronic information store to determine whether matches exist, where the second electronic information includes content provided by an external source. Results are displayed based on matches that are determined to exist with the first electronic information and the second electronic information. The results are combined in a single list of results.

20 Claims, 17 Drawing Sheets

U.S. PATENT DOCUMENTS

| | | | |
|---|---|---|---|
| 5,940,821 A | 8/1999 | Wical | |
| 5,953,716 A | 9/1999 | Madnick et al. | |
| 5,983,214 A | 11/1999 | Lang et al. | |
| 5,987,446 A * | 11/1999 | Corey et al. | 707/3 |
| 5,991,756 A | 11/1999 | Wu | |
| 6,026,429 A | 2/2000 | Jones et al. | |
| 6,029,172 A | 2/2000 | Jorna et al. | |
| 6,038,610 A | 3/2000 | Belfiore et al. | |
| 6,055,540 A | 4/2000 | Snow et al. | |
| 6,055,572 A | 4/2000 | Saksena | |
| 6,078,866 A * | 6/2000 | Buck et al. | 702/2 |
| 6,078,914 A * | 6/2000 | Redfern | 707/3 |
| 6,078,924 A | 6/2000 | Ainsbury et al. | |
| 6,081,805 A | 6/2000 | Guha | |
| 6,094,657 A | 7/2000 | Hailpern et al. | |
| 6,098,066 A | 8/2000 | Snow et al. | |
| 6,108,651 A | 8/2000 | Guha | |
| 6,112,201 A | 8/2000 | Wical | |
| 6,112,227 A | 8/2000 | Heiner | |
| 6,122,740 A * | 9/2000 | Andersen | 726/4 |
| 6,125,353 A | 9/2000 | Yagasaki | |
| 6,175,830 B1 | 1/2001 | Maynard | |
| 6,182,081 B1 | 1/2001 | Dietl et al. | |
| 6,185,550 B1 | 2/2001 | Snow et al. | |
| 6,199,102 B1 | 3/2001 | Cobb | |
| 6,266,664 B1 | 7/2001 | Russell-Falla et al. | |
| 6,275,820 B1 * | 8/2001 | Navin-Chandra et al. | 707/3 |
| 6,278,993 B1 * | 8/2001 | Kumar et al. | 707/3 |
| 6,321,224 B1 | 11/2001 | Beall et al. | |
| 6,321,228 B1 | 11/2001 | Crandall et al. | |
| 6,327,590 B1 * | 12/2001 | Chidlovskii et al. | 707/5 |
| 6,336,117 B1 | 1/2002 | Massarani | |
| 6,356,899 B1 | 3/2002 | Chakrabarti et al. | |
| 6,370,527 B1 * | 4/2002 | Singhal | 707/6 |
| 6,381,599 B1 | 4/2002 | Jones et al. | |
| 6,381,637 B1 | 4/2002 | Kamada | |
| 6,385,602 B1 | 5/2002 | Tso et al. | |
| 6,442,549 B1 | 8/2002 | Schneider | |
| 6,456,998 B1 | 9/2002 | Bui et al. | |
| 6,460,034 B1 | 10/2002 | Wical | |
| 6,463,430 B1 | 10/2002 | Brady et al. | |
| 6,539,375 B2 * | 3/2003 | Kawasaki | 707/5 |
| 6,560,600 B1 | 5/2003 | Broder | |
| 6,574,632 B2 * | 6/2003 | Fox et al. | 707/102 |
| 6,601,061 B1 * | 7/2003 | Holt et al. | 707/3 |
| 6,606,620 B1 | 8/2003 | Sundaresan et al. | |
| 6,615,248 B1 * | 9/2003 | Smith | 709/217 |
| 6,640,223 B1 | 10/2003 | Jones et al. | |
| 6,643,641 B1 * | 11/2003 | Snyder | 707/4 |
| 6,701,310 B1 * | 3/2004 | Sugiura et al. | 707/5 |
| 6,701,318 B2 * | 3/2004 | Fox et al. | 707/10 |
| 6,704,728 B1 | 3/2004 | Chang et al. | |
| 6,704,729 B1 | 3/2004 | Klein et al. | |
| 6,718,365 B1 * | 4/2004 | Dutta | 709/203 |
| 6,721,741 B1 | 4/2004 | Eyal et al. | |
| 6,745,227 B1 | 6/2004 | Bates et al. | |
| 6,785,671 B1 | 8/2004 | Bailey et al. | |
| 6,832,263 B2 * | 12/2004 | Polizzi et al. | 709/246 |
| 6,859,807 B1 * | 2/2005 | Knight et al. | 707/10 |
| 6,938,021 B2 * | 8/2005 | Shear et al. | 705/67 |
| 6,999,959 B1 * | 2/2006 | Lawrence et al. | 707/5 |
| 7,007,008 B2 | 2/2006 | Goel et al. | |
| 7,047,229 B2 | 5/2006 | Goel | |
| 2001/0003828 A1 | 6/2001 | Peterson et al. | |
| 2001/0054041 A1 * | 12/2001 | Chang | 707/5 |
| 2002/0103786 A1 | 8/2002 | Goel | |
| 2002/0103788 A1 | 8/2002 | Donaldson et al. | |
| 2003/0177111 A1 * | 9/2003 | Egendorf et al. | 707/3 |
| 2004/0177015 A1 | 9/2004 | Galai et al. | |
| 2006/0149719 A1 * | 7/2006 | Harris | 707/3 |

FOREIGN PATENT DOCUMENTS

| | | |
|---|---|---|
| EP | 0918295 A | 5/1999 |
| EP | 0945811 A | 9/1999 |
| EP | 1045547 A | 10/2000 |
| JP | 2000357176 | 12/2000 |
| WO | WO 99/39286 | 8/1999 |
| WO | WO 00/26762 | 5/2000 |
| WO | WO 00/58894 | 10/2000 |
| WO | WO 01/16806 | 3/2001 |
| WO | WO 01/27720 | 4/2001 |

OTHER PUBLICATIONS

Brian T. Bartell et al., *Automatic Combination of Multiple Ranked Retrieval Systems*. Paper presented at the 17th Annual ACM Conference on Research amd Development in Information Retrieval (SIGIR-1994).

N. J. Belkin et al., *The Effect of Multiple Query Representations on Information Retrieval Performance*. Paper presented at the 16th Annual ACM Conference on Research and Development in Information Retrieval (SIGIR-1993).

N. J. Belkin et al., *Combining The Evidence of Multiple Query Representations for Information Retrieval*. Information Processing & Management, 31(3), 431-448 (1995).

A. Chowdhury et al., *IIT TREC-9 Entity Based Feedback with Fusion*. Paper presented at the 9th Annual Text Retrieval Conference (TREC-9), National Institute of Standards and Technology, Gaithersburg, MD (Nov. 13-16, 2000).

Peter W. Foltz et al., *Personalized Information Delivery: An Analysis of Information Filtering Methods*. Communications of the ACM, 35(12) (1992).

Edward A. Fox et al., *Combination of Multiple Searches*. Paper presented at the 2nd Annual Text Retrieval Conference (TREC-2), NIST, Gaithersburg, MD (1994).

J. Katzer et al., *A Study of the Overlap Among Document Representations*, Information Technology: Research and Development, 1(2), 261-274 (1982).

K. L. Kwok et al., *TREC-7 Ad-Hoc, High Precision and Filtering Experiments using PIRCS*. Paper presented at the 7th Annual Text Retrieval Conference (TREC-7), NIST, Gaithersburg, MD (1998).

Joon Ho Lee, *Combining Multiple Evidence from Different Properties of Weighting Schemes*. Paper presented at the 18th Annual ACM Conference on Research and Development in Information Retrieval (SIGIR-1995).

Joon Ho Lee, *Analyses of Multiple Evidence Combination*. Paper presented at the 20th Annual ACM Conference on Research and Development in Information Retrieval (SIGIR-1997).

Joon Ho Lee, *Combining the Evidence of Different Relevance Feedback Methods for Information Retrieval*. Information Processing and Management, 34(6), 681-691 (1998).

M. Catherine McCabe et al., *A Unified Environment for Fusion of Information Retrieval Approaches*. Paper presented at the 8th Annual ACM Conference on Information and Knowledge Management (CIKM-1999) (Nov. 1999).

M. McGill et al., *An Evaluation of Factors Affecting Document Ranking by Information Retrieval Systems*. NSF Award Abstract—#7810454. Retrieved Jul. 21, 2005 from World Wide Web: http://www.nsf.gov/awardsearch/showAward.do?AwardNumber=7810454.

Justin Picard, *Modeling and Combining Evidence Provided by Document Relationships Using Probabilistic Argumentation Systems*. Paper presented at the 21st Annual ACM Conference on Research and Development in Information Retrieval (SIGIR-1998), Melbourne, Australia.

S.E. Robertson, *The Probability Ranking Principle in IR*. Journal of Documentaion, 33(4), 294-301 (1977).

S.E. Robertson et al., *Okapi at TREC-4*. Paper presented at the 4th Annual Text Retrieval Conference (TREC-4), NIST, Gaithersburg, MD (1995).

Tefko Saracevic et al., *A Study of Information Seeking and Retrieving, III. Searchers, Searches, and Overlap*. Journal of the American Society for Information Science, 39(3), 197-216 (1988).

Howard Turtle et al., *Evaluation of an Inference Network-Based Retrieval Model*. ACM Transactions on Information Systems, 9(3), 187-222 (1991).

Christopher C. Vogt et al., *Predicting the Performance of Linearly Combined IR Systems*. Paper presented at the 21st Annual ACM Conference on Research and Development in Information Retrieval (SIGIR-1998), Melbourne, Australia (1998).

Christopher C. Vogt et al., *Fusion Via a Linear Combination of Scores*. Information Retrieval, vol. 1, 151-173 (1999).

Ellen. M. Voorhees et al., *The Collection Fusion Problem*. Paper presented at the 3rd Annual Text Retrieval Conference (TREC-3), NIST, Gaithersburg, MD (1994).

W. John Wilbur, *The Knowledge in Multiple Human Relevance Judgments*. ACM Transactions on Information Systems, 16(2), 101-126 (1998).

Ellen M. Voorhees et al., *Learning Collection Fusion Strategies*. In Proceedings of the 12th Annual Machine Learning Conference, Lake Tahoe, CA, 172-179 (Jul. 1995).

Rila Mandala et al., *Combining Multiple Evidence from Different Types of Thesaurus for Query Expansion*, Berkley, CA, SIGIR-1999 (Aug. 1999).

Allison L. Powell et al., *The Impact of Database Selection on Distributed Searching*, SIGIR-2000, Athens, Greece (Jul. 2000).

Christoph Baumgarten, *A Probabilistic Solution to the Selection and Fusion Problem in Distributed Information Retrieval*, SIGIR-1999, Berkley, CA (Aug. 1999).

Xiaolan Zhu et al., *Incorporating Quality Metrics in Centralized/Distributed Information Retrieval on the World Wide Web*, SIGIR-2000, Athens, Greece (Jul. 2000).

Jim Hu, "AOL developing search engine," CNET.com—News—Entertainment & Media—AOL developing search engine, pp. 1-3 (Jun. 21, 1999), http://news.cnet.com/news/0-1005-200-343860.html.

T. Negrino, "The MacWorld Web Searcher's Companion," MacWorld, PC World Communications, San Francisco, CA, US, vol. 17, No. 5, May 2000, pp. 76-82, XP008019722.

T. Negrino, "The MacWorld Web Searcher's Companion," MacWorld, PC World Communications, San Francisco, CA, US, vol. 17, No. 5, May 2000, pp. 76-82 (XP008019722).

"Developement and Operation of the Next-Generation Rating/Filtering System on the Internet," (XP002219058). Retrieved from the Internet:<URL:http://www.nmda.or.jp/enc/rating2nd-en.html> on Oct. 30, 2002.

Ian Leicht, "Re: My spamblock; Was: Thwarting UCE address culling program" [online]. Jan. 26, 1997. Retrieved from Internet newsgroup: <news.admin.net-abuse.email> [retrieved on Jul. 15, 2003], pp. 1-2.

\* cited by examiner

990

MATCHING SITES                        (1 - 10 of 10894) next >>
The following results are from the World Wide Web and may contain objectionable material that AOL does not endorse.

932:

92% Long Island's Best Restaurants
Includes menus, directions, and photos.
http://www.longislandbistro.com
Show me more like this

87% Best Restaurants of Australia
Everything you need to about this gourmet's paradise with lots of pics, menus, wines and articles. Has a searchable data base.
http://www.bestrestaurants.com.au
Show me more like this

86% Best Restaurant Equipment Co.
Online ordering of food service and hotel equipment. Supplies also available. Located in Stratford, Connecticut.
http://www.bestrestaurantequip.com
Show me more like this

84% San Francisco - Best 100 Restaurants
The San Francisco Gate rates the 100 best restaurants in the Bay Area.
http://www.sfgate.com/eguide/food/best100
Show me more like this

82% Best Italian Restaurant
Italian cafe and pizzeria located just off the main parkway in downtown Gatlinburg, Tennessee. Site features on-line menu, prices, and dining coupons.
http://www.bestitalian.net
Show me more like this

76% The Isabella Restaurant, The South's Best Southern Continental Cuisine
The South's Best Southern Continental Cuisine
http://www.jackson-online.com/isabella
Show me more like this

76% Saint Albans Best Restaurants
Find some of Vermont's best places to eat in St. Albans.

Fig. 9e

AOL.COM

▸ AOL Mail  ▸ My AOL.COM  ▸ People/Chat  ▸ Search  ▸ Shop  ▸ Web Centers  ▸ Try AOL FREE!

Enter words below and click Search.

AOL.COM SEARCH    [best restaurants]  [Search]

Home | Search Options | Help

Search Results for "best restaurants"

| Web Sites | Web Pages | Related Music |

1075

RECOMMENDED SITES
- The Best of the City - Get picks on the best your city has to offer

MATCHING CATEGORIES                           (1 - 4 of 584) next >>
1. Regional > North America > United States > Louisiana > Localities > M > Metairie > Business and Economy > Restaurants and Bars
2. Regional > Caribbean > Aruba > Business and Economy > Restaurants and Bars
3. Regional > Middle East > Israel > Business and Economy > Restaurants and Bars
4. Regional > North America > United States > Connecticut > Counties > Middlesex County > Business and Economy > Restaurants and Bars

MATCHING SITES                                 (1 - 10 of 10894) next >>
The following results are from the World Wide Web and may contain objectionable material that AOL does not endorse.

92% Long Island's Best Restaurants
Includes menus, directions, and photos.
http://www.longislandbistro.com
Show me more like this 87% Best Restaurants of Australia
Everything you need to about this gourmet's paradise with lots of pics, menus, wines and articles. Has a searchable data base.
http://www.bestrestaurants.com.au
Show me more like this 86% Best Restaurant Equipment Co.
Online ordering of food service and hotel equipment. Supplies also available. Located in Stratford, Connecticut.
http://www.bestrestaurantequip.com
Show me more like this 84% San Francisco - Best 100 Restaurants
The San Francisco Gate rates the 100 best restaurants in the Bay Area.
http://www.sfgate.com/eguide/food/best100
Show me more like this 82% Best Italian Restaurant
Italian cafe and pizzeria located just off the main parkway in downtown Gatlinburg, Tennessee. Site features on-line menu, prices, and dining coupons.
http://www.bestitalian.net
Show me more like this 76% The Isabella Restaurant, The South's Best Southern Continental Cuisine
The South's Best Southern Continental Cuisine
http://www.jackson-online.com/isabella
Show me more like this 76% Saint Albans Best Restaurants
Find some of Vermont's best places to eat in St. Albans.

Search books:
amazon.com

BEST RESTAUR...

RELATED HOT SEARCHES
- natures best restaurant
- the new connecticuts best restaurants
- new york best restaurants
- best restaurants naples fl
- best restaurants in italy

AOL.COM

- AOL Mail | ▶ My AOL.COM | ▶ People/Chat | ▶ Search | ▶ Shop | ▶ Web Centers | ▶ Try AOL FREE!

Enter words below and click Search.

AOL.COM Search | best restaurants | [Search]

Home | Search Options | Help

Search Results for "best restaurants"

Web Sites | Web Pages | Related Music

RECOMMENDED SITES
- The Best of the City - Get picks on the best your city has to offer

MATCHING WEB PAGES    (1 - 10 of 306563) next >>
The following results are from the World Wide Web and may contain objectionable material that AOL does not endorse.

99% BEST OF Cypress - Best restaurants, accommodations, shopping, and real estate services in Cypress, Orange County.
A listing of the best restaurants, accommodations, shopping, and real estate services in the Orange County, California city of Cypress
http://www.bestofcypress.com/

99% BEST OF Capistrano - Best restaurants, accommodations, shopping, and real estate services in San Juan Capistrano.
A listing of the best restaurants, accommodations, shopping, and real estate services in the Orange County, California cities of Capistrano, San Juan Capistrano and Capistrano Beach
http://www.bestofcapistrano.com/

99% BEST OF Anaheim - Best restaurants, accommodations, shopping, and real estate services in Anaheim, Orange County.
A listing of the best restaurants, accommodations, shopping, and real estate services in the Orange County, California city of Anaheim
http://www.bestofanaheim.com/

99% BEST OF Balboa - Best restaurants, accommodations, shopping, and real estate services in Balboa, Orange County.
A listing of the best restaurants, accommodations, shopping, and real estate services in the Orange County, California city of Balboa
http://www.bestofbalboa.com/

98% BEST OF Westminster - Best restaurants, accommodations, shopping, and real estate services in Westminster, Orange
A listing of the best restaurants, accommodations, shopping, and real estate services in the Orange County, California city of Westminster
http://www.bestofwestminster.com/

98% BEST OF Stanton - Best restaurants, accommodations, shopping, and real estate services in Stanton, Orange County.
A listing of the best restaurants, accommodations, shopping, and real estate services in the Orange County, California city of Stanton
http://www.bestofstanton.com/

98% BEST OF Irvine - Best restaurants, accommodations, shopping and real estate services in Irvine, Orange County.
A listing of the best restaurants, accommodations, shopping, and real estate services in the Orange County, California city of Irvine
http://www.bestofirvine.com/

Search books:
amazon.com
BEST RESTAUR...

RELATED HOT SEARCHES
- natures best restaurant
- the new connecticuts best restaurants
- new york best restaurants
- best restaurants naples fl
- best restaurants in italy

Fig. 10c

DISPLAYING SEARCH RESULTS

This application claims priority from U.S. Provisional Application No. 60/223,695, filed Aug. 8, 2000, which is incorporated by reference.

TECHNICAL FIELD

This invention relates to searching systems and processes, and more particularly to displaying search results.

BACKGROUND

With the explosion of information on the Internet, it has become increasingly difficult to conduct a search on the Internet that returns results in a manner and a format that are useful to the person conducting the search. Frequently, when a search is performed, the most useful and relevant results may be scattered and buried among thousands of results.

In other instances, when a search is performed on the Internet, a search may yield few or no results even though relevant results exist on the Internet. Few or no results may occur because the Internet sites and the web pages within Internet sites that contain the desired results may not be searchable.

SUMMARY

In one general aspect, website search results obtained from searching multiple electronic information stores may be displayed transparently without distinguishing the electronic information store. The search may be performed by a web host and may include receiving at least one search term that then is compared with first electronic information within a first electronic information store to determine whether matches exist, where the first electronic information includes content provided by an internal source. The search term also is compared with second electronic information within a second electronic information store to determine whether matches exist, where the second electronic information includes content provided by an external source. Results are displayed based on matches that are determined to exist with the first electronic information and the second electronic information. The results are combined in a single list of results.

Embodiments may include one or more of the following features. For example, several search terms may be received and grouped as a single string by default.

The results may be displayed such that whether the results are obtained from the external source or the internal source is transparent to a user viewing the single list of results. The first electronic information may include proprietary web content and the second electronic information may include non-proprietary content.

The results may include a ranked list of website identifiers. The results from the matches with the internal source may be ranked higher than the results from matches with the external source.

In another general aspect, displaying website search results that are produced from having a web host search multiple electronic information stores may include receiving at least one search term. The search term is compared with first electronic information within a first electronic information store to produce first results based on matches that are determined to exist. The search term is also sent to a third party search service for use in comparing the search term to at least second electronic information within a second electronic information store to produce second results based on matches that are determined to exist. The second results are received from the third party search service, the first results and the second results are combined, and the combined first results and second results are displayed as a single list of results. The results include at least one website identifier.

Embodiments may include one or more of the following features. For example, the single list of results may be transparent to a source of the results. The second electronic information may be maintained by the third party search service.

The first electronic information may include proprietary information. The second electronic information may include information that is non-proprietary to a provider of the first electronic information. Additionally or alternatively, the second electronic information may include information that is proprietary to the third party search service. Furthermore, the first electronic information may be maintained by an Internet service provider. The results may include identifiers of several web sites, and the identifiers may be ranked.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

FIG. 9*e* is an exemplary screen shot that shows the results of the web site search.

FIG. 10*b* is an exemplary screen shot that shows the displayed search results.

FIG. 10*c* is an exemplary screen shot that shows matching web page results.

Like reference symbols in the various drawings indicate like elements.

DETAILED DESCRIPTION

For illustrative purposes, FIGS. 1-6 describe a communications system for implementing techniques for transferring files between subscribers of an instant messaging host complex. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
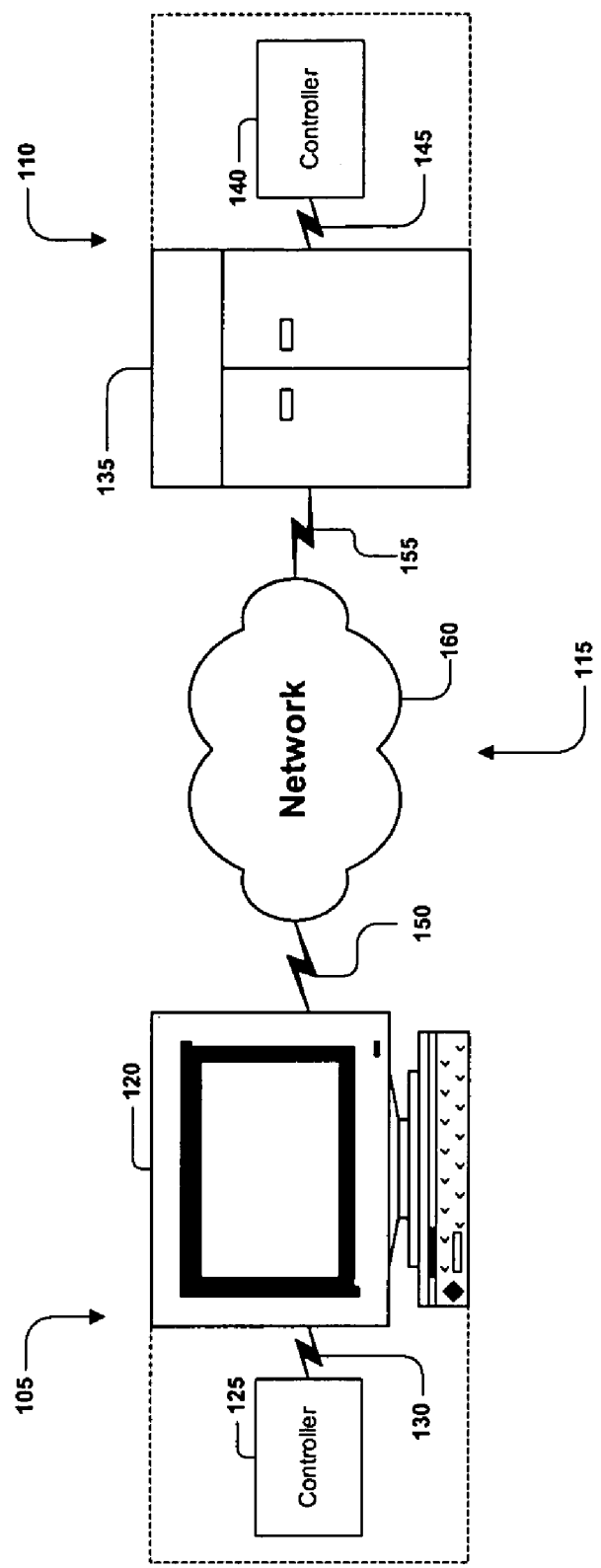
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
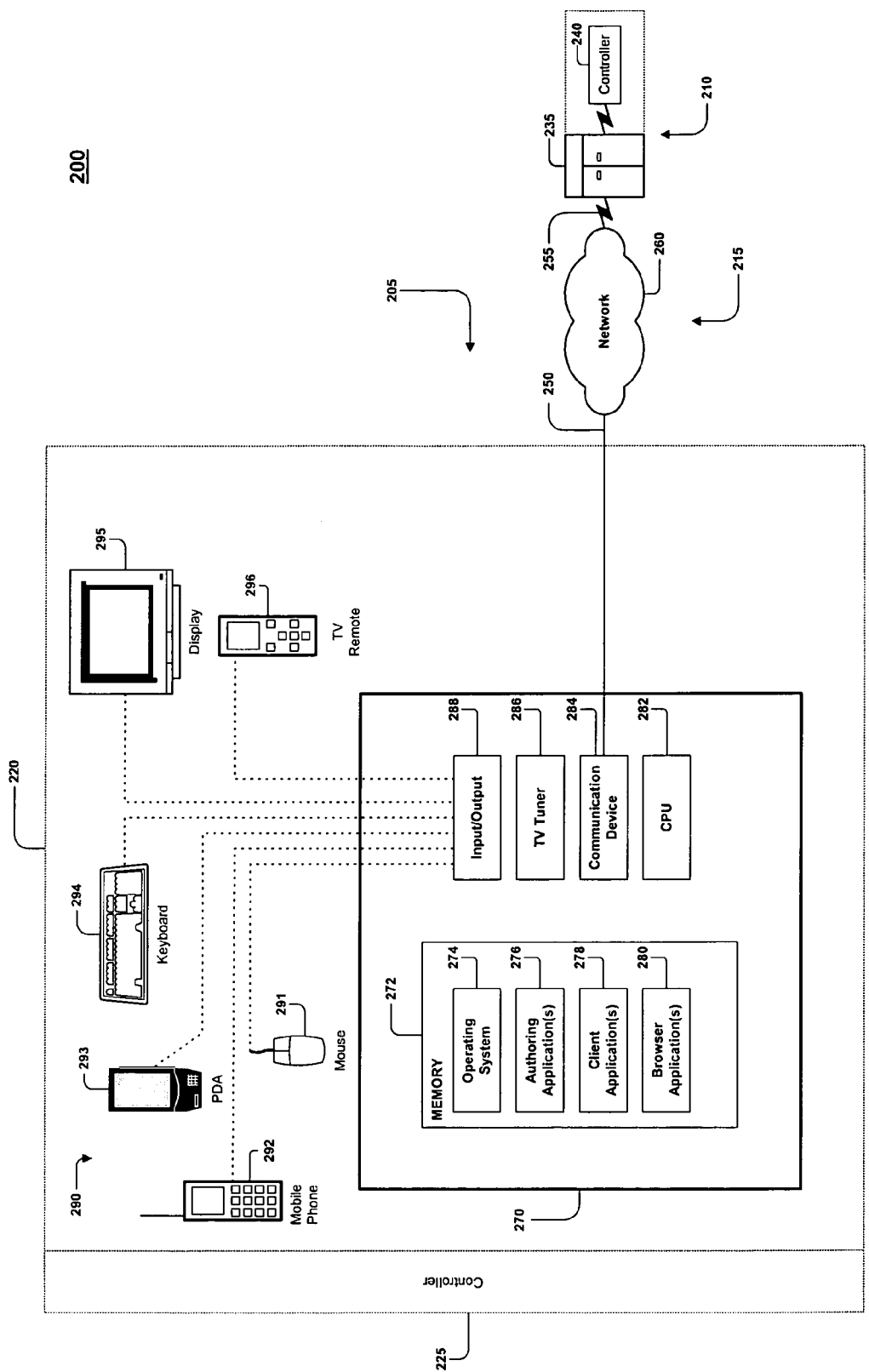
FIGS. 2-6 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to and may illustrate one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some or all of the components and devices described above.

Figure 3:
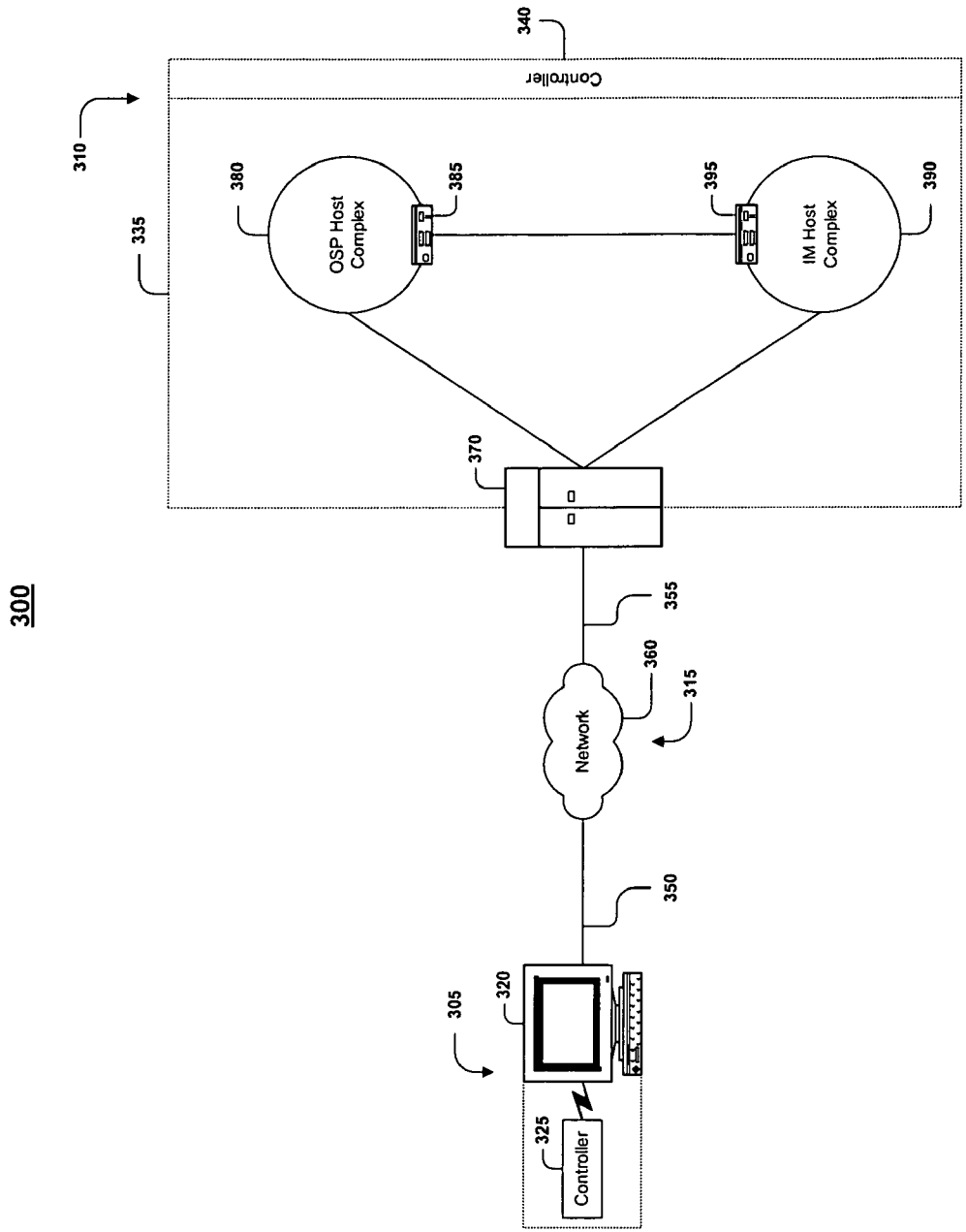

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and may illustrate one possible embodiment of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, for example, an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other, certain protocols (i.e., standards, formats, conventions, rules, and structures) being employed to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
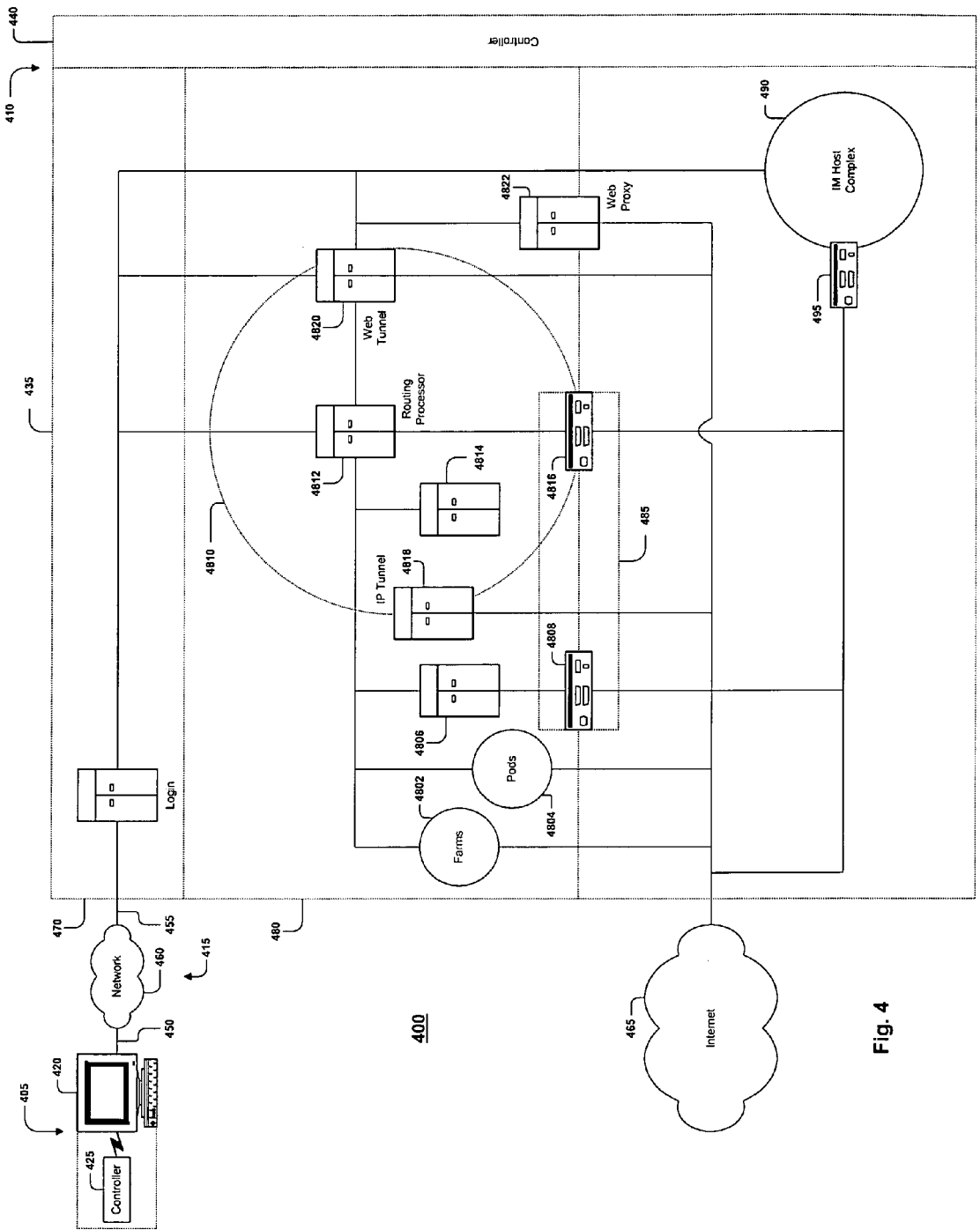

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and may illustrate one possible embodiment of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using OSP protocols that may or may not be exclusive or proprietary. The client controller 425 also may include applications, such as an IM client application and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host device 435 includes a login server 470 capable of enabling communications between client systems 405 and various elements of the host system 410, including elements such as OSP host complex 480 and IM host complex 490. The login server 470 may implement one or more authorization procedures to enable simultaneous access to one or more of these elements.

The OSP host complex 480 and the IM host complex 490 are typically connected through one or more OSP host complex gateways 485 and one or more IM host complex gateways 495. Each OSP host complex gateway 485 and IM host complex gateway 495 may generally perform protocol conversions necessary to enable communication between one or more of the OSP host complex 480, the IM host complex 490, and the Internet 465.

The OSP host complex 480 supports a set of services to be accessed through and/or performed by from one or more servers located internal to and external from the OSP host complex 480. Servers external to the OSP host complex 480 may communicate using the Internet 465. Servers internal to the OSP complex 480 may be arranged in one or more configurations. For example, servers may be arranged in large centralized clusters identified as farms 4802 or in localized clusters identified as pods 4804.

More specifically, farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other remotely-located or performed processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

By contrast to farms 4802, pods 4804 are clusters of localized servers that provide some services offered by the OSP host complex 480 from a location local to the service or information recipient, which reduces and avoids time delays and congestion inherent in centralized processing. Each pod 4804 includes one or more interrelated servers capable of operating together to provide one or more services offered by the OSP host complex 480 in a geographically localized manner, with the servers of a pod 4804 generally operating independently of resources external to the pod 4804. A pod 4804 may cache content received from external sources, such as farms 4802 or the Internet 465, making frequently requested information readily available to the local service or information recipients served by the pod 4804. In this way, pods 4804 are particularly useful in providing services that are independent of other processes and servers such as, for example, routing to other localized resources or recipients, providing access to keywords and geographically specific content, providing access to routinely accessed information, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded and non-farmed servers 4806. In general, the servers 4806 may be dedicated to performing a particular service or information that relies on other processes and services for information and may be directly or indirectly connected to resources outside of the OSP host complex 480, such as the Internet 465 and the IM host complex 490, through an OSP gateway 4808 within OSP host complex gateway 485. In the event that subscriber usage of a particular service or information of the servers 4806 becomes relatively high, those servers 4806 may be integrated into a farm or pod, as appropriate.

In the implementation of FIG. 4, one particular exemplary pod 4810 is shown in more detail. Pod 4810 includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or the routing processor 4812 may direct the data request externally to elements such as the IM host complex 490 through an OSP/pod gateway 4816.

The routing processor 4812 also may direct data requests and/or otherwise facilitate communication between the client system 405 and the Internet 465 through the OSP/pod gateway 4816. In one implementation, the client system 405 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access pods 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol"), and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine demographic information such as the subscriber's parental control settings. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
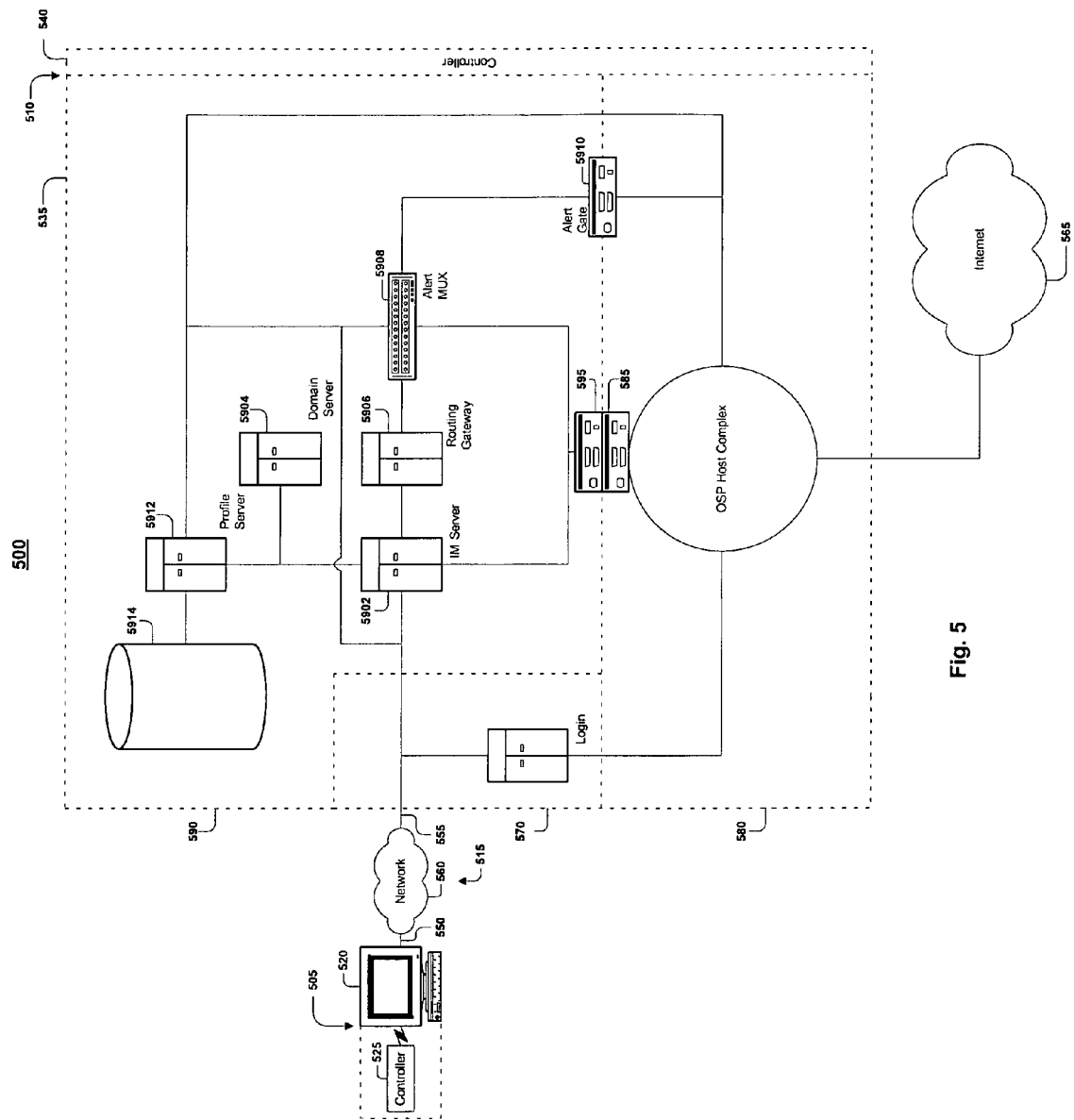

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and may illustrate one possible embodiment of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 using exclusive IM protocols. The client controller 525 also may include applications, such as an OSP client application and/or an Internet browser application, for communicating with elements such as the OSP host complex 580 and the Internet 565.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. In other implementations, as described above, the host controller 540 may include any of several other programs, machines, and devices operating independently or collectively to control the host device 535.

The host system 510 includes a login server 570 capable of enabling communications between client systems 505 and various elements of the host system 510, including elements such as the OSP host complex 580 and IM host complex 590; login server 570 is also capable of authorizing access by the client system 505 and those elements. The login server 570 may implement one or more authorization procedures to enable simultaneous access to one or more of the elements. The OSP host complex 580 and the IM host complex 590 are connected through one or more host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. The domain servers 5904 can be used to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, IM server 5902 is directly or indirectly connected to a routing gateway 5906. The routing gateway 5906 facilitates the connection between the IM server 5902 and one or more alert multiplexors 5908. For example, routing gateway 5906 may serve as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing a hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie) used to gain access to the identified multiplexor 5908. The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to enable communication with the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. The alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Thereafter, upon detecting an alert feed, the alert gate 5910 contacts the alert multiplexor 5908, which in turn, informs the appropriate client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, geographic location and other demographic data. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
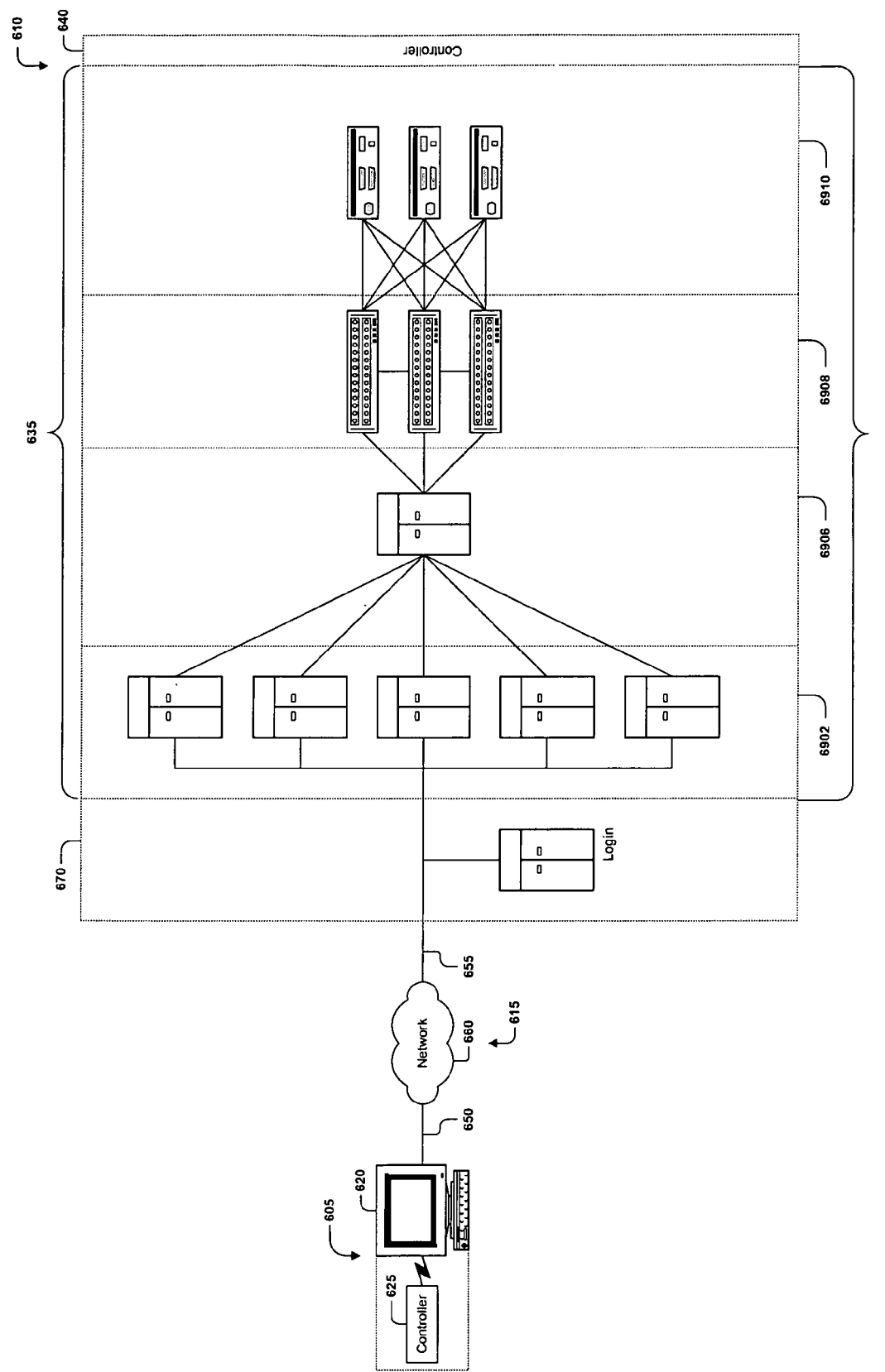

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5. Likewise, the host system 610 of FIG. 6 may have attributes comparable to and may illustrate one possible embodiment of the host systems 110, 210, 310, 410 and 510 shown in FIGS. 1-5. FIG. 6 describes several aspects of one implementation of the host system 610 in greater detail, focusing primarily on one particular implementation of the login server 670 and IM host complex 690.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 using exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. In other implementations, as described above, the host controller 640 may include any of several other programs, machines, and devices operating independently or collectively to control the host device 635.

The host system 610 includes a login server 670 capable of enabling communications between client systems 605 and various elements of the host system 610, including elements such as the IM host complex 690 and the OSP host complex (580 in FIG. 5); login server 670 is also capable of authorizing access by the client system 605 and those elements. The IM host complex 690 includes an IM server network 6902, a routing gateway 6906, an alert multiplexor network 6908, and one or more alert gates 6910. The IM server network 6902 may include an interconnected network of IM servers and the alert multiplexor network 6908 may include an interconnected network of alert multiplexors. In the implementation of FIG. 6, the IM server network 6902 and the alert multiplexor network 6908 are interconnected by a routing gateway 6906 that serves as a common hub to reduce the number of connections. Each IM server within IM server network 6902 can directly or indirectly communicate and exchange information with one or more of the alert multiplexors in the alert multiplexor network 6908. Each of the alert multiplexors in the alert multiplexor network 6908 may be connected to several alert gates 6910 that receive different types of alerts.

During a session, a subscriber typically will be assigned to one IM server in the IM server network 6902 and to one alert multiplexor in the alert multiplexor network 6908 based on one or more hashing techniques. In one implementation, for example, each IM server in the IM server network 6902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Searching

Figure 7:
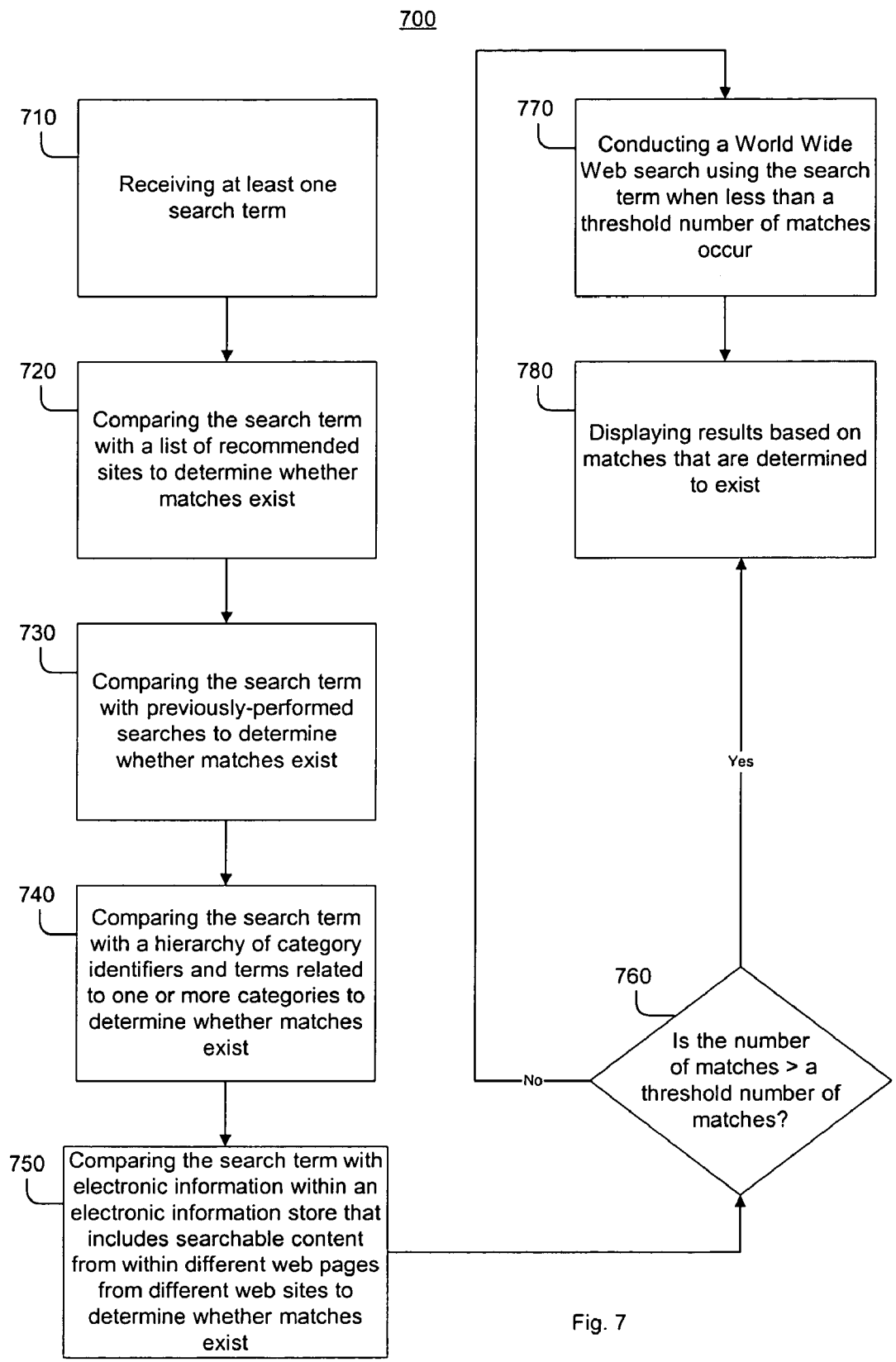
FIG. 7 is a flowchart of a process for performing an electronic search, which may be performed by components of the systems shown in FIGS. 1-6.

Referring to FIG. 7, an electronic search is performed according to a process 700. The search, which may be a search of the Internet, may be performed, for example, by the systems described above with respect to FIGS. 1-6. For instance, process 700 may be performed by one or more of the pods 4804 of FIG. 4. Additionally or alternatively, process 700 may be performed by one or more non-podded servers, such as servers 4806 or farms 4802 of FIG. 4. Process 700 also may be performed by any other hardware component or software component capable of being programmed to receive, process, and send instructions in the manner described.

Process 700 generally includes receiving at least one search term (step 710). The search term then is compared with a list of recommended sites (step 720), previously performed searches (step 730), a hierarchy of category identifiers and terms related to one or more categories (step 740), and an electronic information store that includes content displayed by and/or extracted from different web pages from different web sites (step 750) to determine whether matches exist. Next, a determination is made as to whether a threshold number of matches have been identified between the search term and one or more of the list of recommended sites, the previously conducted searches, the hierarchy of category identifiers, and the electronic information (step 760). An electronic search (e.g., an Internet search using the World Wide Web (WWW)) based on the search term is conducted when less than a threshold number of matches are identified (step 770). Finally, results that are based on identified matches are displayed (step 780).

Several search terms may be received (step 710) and may be grouped by default as a single string, or may be grouped in other ways. The search terms are typically received from a client system 105, 205, 305, 405, 505, or 605, or from one or more components of the client system, as shown and described in FIGS. 1-6. Search terms generally include text defined by letters and/or numbers. However, search terms also may include other searchable content, such as symbols, other alphanumeric characters, and geometric constructs (e.g., arcs); Boolean operators (e.g., AND, OR, ADJ, NOT, NEAR) generally used to define relationships between search terms; parentheses and quotation marks generally used to indicate precision and to group search terms; wild card characters (e.g., ? and *) generally used to represent a portion of a search term; and concept operators (e.g., !) generally used to broaden the search term or phrase to a list of related words related to the search term or phrase in order to search using these related words.

The recommended sites to which the search term is compared (step 720) may include web sites that have been specially designated as recommended sites, web content that is considered proprietary to a web host such as an Internet Server Provider (ISP), or non-proprietary content such as content from an Internet site that has been specially designated to provide content. The recommended sites typically include web site identifiers, such as web site titles, descriptions, and addresses. Web sites may be designated as recommended sites by a human operator, by a process performed by a computer, or otherwise. In any case, criteria used to designate a web site as a recommended site may include, for example, the number of times a site is accessed or the web site content. When matches occur between the search term and one or more of the recommended sites, results are displayed (step 780). The displayed results generally include one or more web site identifiers. An example of a displayed result is shown in FIG. 10b under the heading "Recommended Sites" 1075.

Comparing the search term with previously performed searches to determine whether matches exist (step 730) may include comparing the search term with previously received search terms, such as those stored in an electronic data store (e.g., a memory or a database). The search term also may be compared with the results of previously-performed searches to determine whether matches exist. Based on matches that are determined to exist, results are displayed (step 780), as shown for example under the heading "Related Hot Searches" 1085 in FIG. 10b. The results generally include a list of search terms for previously-performed searches that share one or more of the received search terms. Selecting one of the results by mouse click or otherwise typically invokes a search process (e.g., process 700) with respect to the chosen result, but may also or alternatively invoke display of the results of previously-performed searches that are retrieved from storage or memory.

Category Searching

Figure 8A:
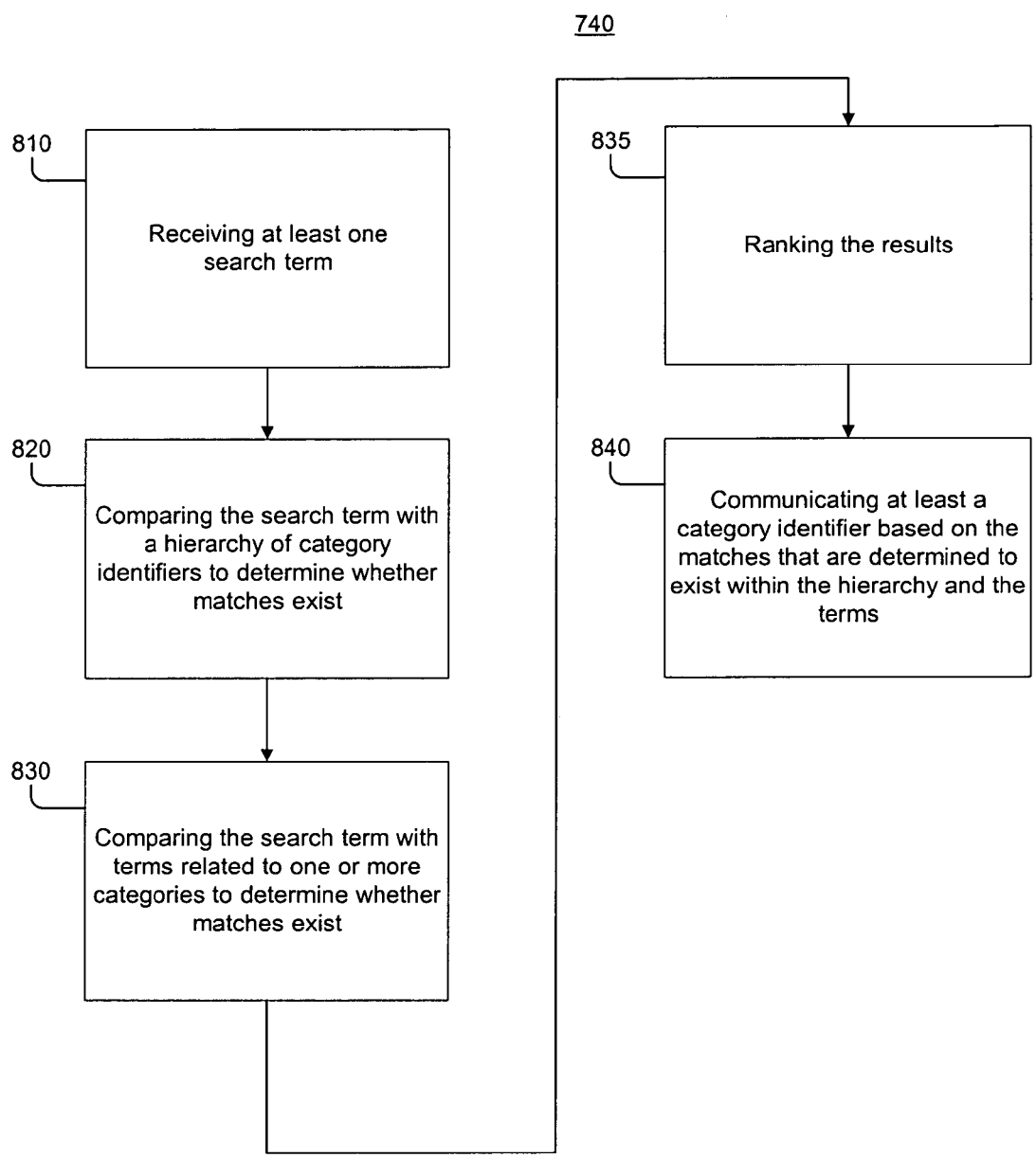
FIG. 8*a* is a flowchart of a process for performing a category search as part of the process of FIG. 7.

Comparing the search term with a hierarchy of category identifiers and/or terms related to one or more categories to determine whether matches exist (step 740) is described in more detail with reference to FIG. 8a, which shows an exemplary process for performing a category search. In the implementation of FIG. 8a, process 740 generally includes receiving at least one search term (step 810), comparing the search term with a hierarchy of category identifiers to determine whether matches exist (step 820), comparing the search term with terms related to one or more categories to determine whether matches exist (step 830), ranking results of the comparisons (step 835), and communicating at least a category identifier based on the matches that are determined to exist within the hierarchy and the terms (step 840).

The search terms received (step 810) generally include the search terms that were received (step 710) for use in performing an electronic search. As such, one or more search terms may be received, and may be grouped together for searching purposes as a single string by default, or may be grouped in other ways.

The hierarchy of category identifiers with which the search terms are compared (step 820) may include identifiers used to represent categories and information relating to those categories. For example, in one implementation, the hierarchy of category identifiers may include a hierarchy of category names, where groups of the category names are linked together in a hierarchical relationship. In this instance, names in the hierarchy represent categories, the names of which are linked together using sub-categories. The hierarchy of category identifiers also may include other related information, such as a list of web sites that are related to the category by name, description, or otherwise.

Figure 8B:
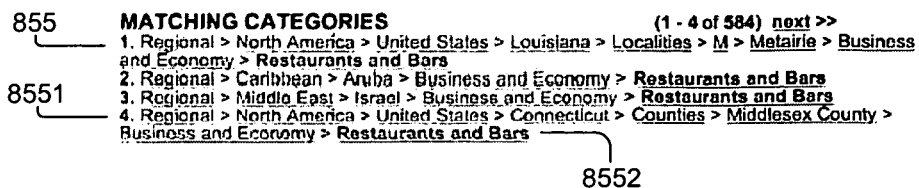
FIG. 8*b* is an exemplary screen shot that shows the results of the category search performed in FIG. 8*a*.

Referring to FIG. 8b, an exemplary screen shot 850 illustrates an example of a hierarchy of category identifiers 855. In this instance, the hierarchy of category identifiers 855 appears as a linked list of category names that are affiliated with specific categories. The hierarchical relationship among category identifiers and other related information typically is ordered with broad category names and information followed by more narrow names and information. Other forms and data contents also may be used to express a hierarchy of category identifiers. For instance, the category identifier may additionally or alternatively include other information representing categories therein, such as text, alphanumeric characters, symbols and combinations thereof. In one implementation, some or all of the hierarchy of category identifiers may be arranged by and/or received from a third party listing service (e.g., Open Directory Project).

In comparing the search terms (step 820), matches are typically determined to exist when a received search term matches one or more of the identifiers within the hierarchy of category identifiers. When several received search terms are grouped as a single string for searching purposes, the comparison includes comparing the single string of search terms with the hierarchy of category identifiers to determine whether matching strings exist.

Comparing the search term with terms related to one or more categories to determine whether matches exist (step 830) may include using information related to categories, such as a name of a web site corresponding to a category, a description of the web site, or other related terms. When several search terms are received and grouped as a single string, the comparison (step 830) may include comparing the single string of search terms with the terms related to one or more categories to determine whether matches exist. To improve searchability of terms provided by third party listing services (e.g., Open Directory Project), the comparison may include converting received or related terms to a predesignated searchable format, e.g., by indexing and cataloguing the terms.

Ranking the results (step 835) generally includes ranking the results of comparisons performed in either, both, or the combination of steps 820 and 830. The category identifiers may be ranked based on at least one of a number of matches that are determined to exist, the relative locations of matches, and the relative types of matches. For instance, the potential relevance of a matching category is generally deemed to increase as the number of identified matches increase. Furthermore, the potential relevance, and hence the rank, of a matching category is deemed to change based on the existence and frequency of matches that occur within different types of information, such as the hierarchy of category identifiers (step 820) and the terms related to one or more categories (step 830). For instance, the results may be ranked based on the existence and number of matches between a search term and the hierarchy of category identifiers, or within the terms related to one or more categories.

Ranking of matching categories and corresponding category identifiers also may be based on the relative location of the matches within the hierarchy of category identifiers. For example, a match occurring in a category identifier that represents a narrow category may be ranked higher than a match occurring within a category identifier that represents a broader category, or vice versa. Further, category identifiers that include matches occurring within the hierarchy of category identifiers are generally ranked higher than category identifiers that include matches that occur within the terms related to one or more categories. Ranking the category identifiers based on the type of the match also may include ranking the category identifiers based on whether the matches occur within at least one of the terms related to one or more categories and the hierarchy of category identifiers. When category identifiers include matches occurring within more than one type, those identifiers are ranked higher than category identifiers that contain matches occurring within only one of the types. For example, a category having matches occurring within both the hierarchy of category identifiers and the terms related to one or more categories is typically ranked higher than a category that includes matches occurring within only one of the hierarchy of category identifiers and the terms related to one or more categories.

Communicating at least a category identifier (step 840) generally includes communicating information revealing matches that are determined to exist within the hierarchy and the related terms. The results communicated generally include at least a category identifier, and are provided for use in a displaying process, such as display step 780 of FIG. 7, for eventual display to a user of a client system.

Figure 8C:
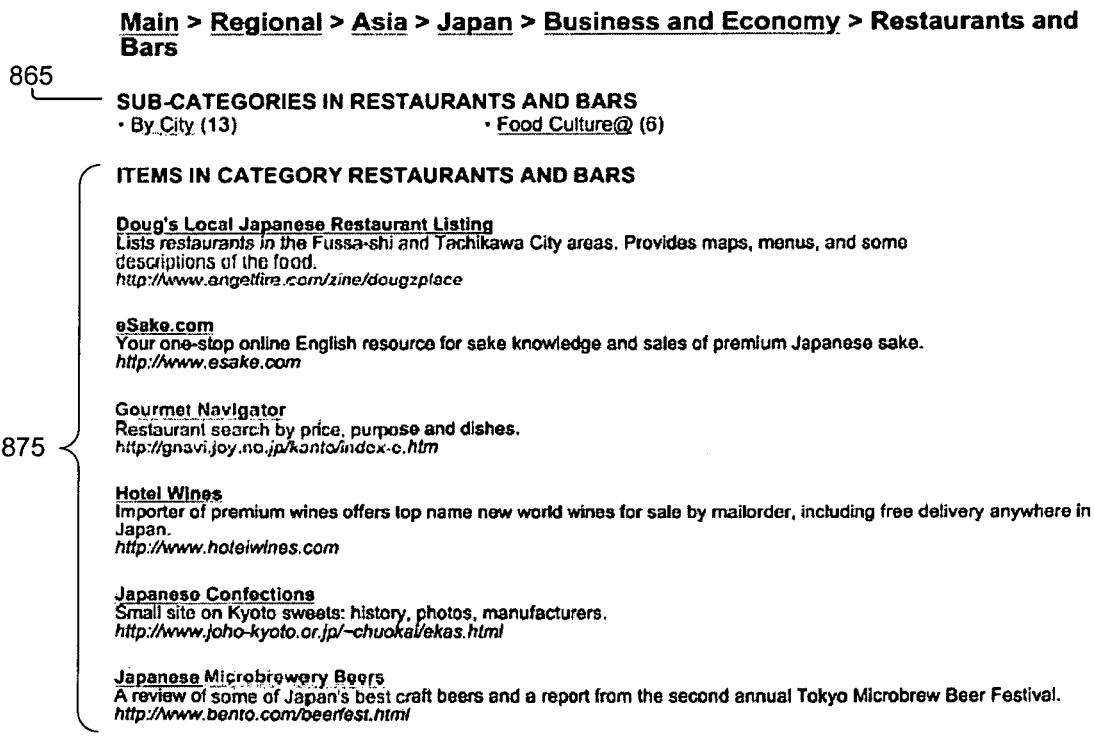
FIG. 8*c* is an exemplary screen shot that shows more detailed results of the category search performed in FIG. 8*a*.

Referring to FIG. 8b, an example of results communicated (step 840) is displayed under the heading, "Matching Categories." The matching categories of FIG. 8b include several hierarchies of category identifiers, with each hierarchy of category identifiers being ranked in terms of relevance to the proffered search term. The hierarchy of category identifiers shown by FIG. 8b is a listing of category identifiers. The listing starts with an identifier 8551 for a broad category and descends to an identifier for a more narrow category, with the last category identifier 8552 being the final matching category name. A hierarchy that includes a match within the final category name is generally ranked higher (step 830) than a hierarchy that includes a match within a category name other than the final category name within the hierarchy of category identifiers. In one implementation, selecting one of the categories using a mouse or otherwise will reveal another screen shot 860, as shown, e.g., in FIG. 8c. Each category may include a listing of sub-categories 865 and web sites 875 within those categories. For instance, the listing for a web site within a category may include the title of the web site, a description of the web site, and an address for the web site.

Matching Sites Search

Figure 9A:
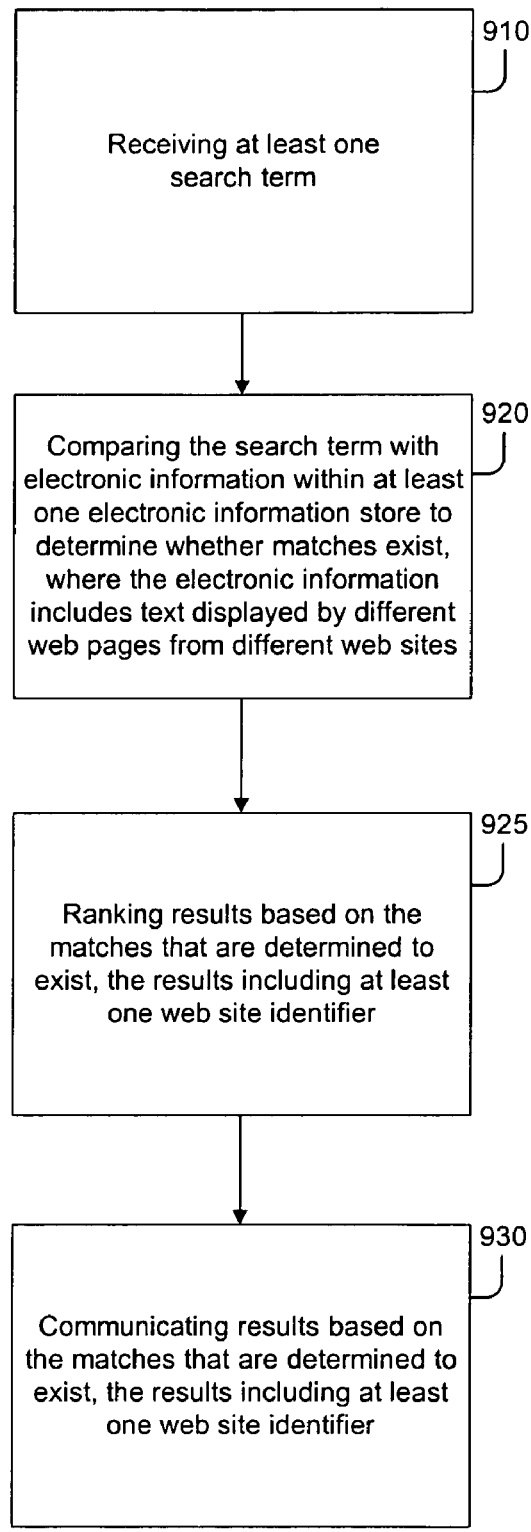
FIG. 9*a* is a flowchart of a process for performing a web site search as part of the process of FIG. 7.

Referring to FIG. 9a, another aspect 750 of the search process 700 shown by FIG. 7 is described for performing a search to identify web sites that relate to a search term. In this search process 750, the search term is compared against text or other searchable content displayed or extracted from the actual web site(s). Process 750 of FIGS. 7 and 9a generally includes receiving at least one search term (step 910), comparing the search term with electronic information within at least one electronic information store to determine whether matches exist (step 920), ranking results of the comparison (step 925), and communicating results based on the matches that are determined to exist (step 930).

The search terms received (step 910) generally include the search terms that were received (step 710) for use in performing an electronic search. As such, one or more search terms may be received, and may be grouped together for searching purposes as a single string by default, or may be grouped in other ways.

The received search terms may be compared (step 920) to electronic information within at least one electronic information store to determine whether matches exist. The electronic information may include, for example, text or other searchable content displayed by and/or extracted from web pages from different web sites. When several search terms are received, the comparison (step 920) may include comparing the single string of search terms with the electronic information within the electronic information store to determine whether matches exist. The electronic information may include partial or full text displayed by different web pages from different web sites (e.g., an introductory or home page), titles, descriptions, and addresses of web sites.

Ranking the results (step 925) generally includes ranking search results based on an algorithm that takes into account various aspects of the results achieved. For example, the identifiers for the several web sites may be ranked based on a number of the matches that are determined to exist between the search term and the electronic information corresponding to the web sites. Ranking the identifiers for the several web sites also may be based on whether matches occur within one or more of the text, the title, the description, and the addresses of the web site. For instance, identifiers with more than one of the title, description, text, and web address that match a search term are generally ranked higher than identifiers with only one of the title, description, text, and web address that match the same search term.

In addition, the ranking also may be based on which of these forms of electronic information are matched and where the matches occur. For example, identifiers with titles that match a search term may be ranked higher than identifiers with descriptions that match the same search term, which may be ranked higher than identifiers with web addresses that match the same search term, which may be ranked higher than identifiers with text that matches the same search term.

Communicating results (step 930) may be based on matches that are determined to exist from the comparison (step 920). For instance, the search results communicated (step 930) may be provided for use in a displaying process, such as displaying step 780 of FIG. 7, for eventual display to a user of, e.g., a client system. The results communicated typically include an identifier for each matching web site, such as a title, a description, address information, text, characters, symbols, or combinations thereof used to identify or describe a web site. For example, FIG. 9e shows an exemplary display 990 of identifiers 932.

Filtering Search Results

Figure 9B:
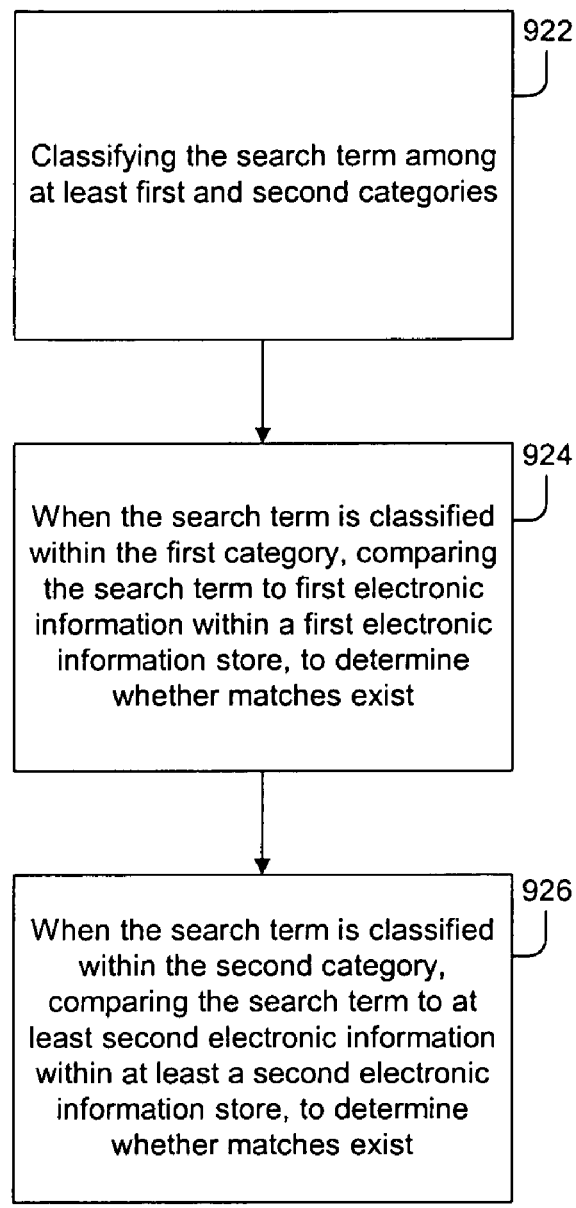
FIG. 9*b* is a flowchart of a process for searching different data stores as part of the process of FIG. 9*a*.

Referring also to FIG. 9b, comparing the search term with electronic information within at least an electronic information store (step 920) may include classifying the search term among at least first and second categories (step 922), comparing the search term to first electronic information within a first electronic information store to determine whether matches exist when the search term is classified within the first category (step 924), and comparing the search term to at least second electronic information within at least a second electronic information store to determine whether matches exist when the search term is classified within the second category (step 926). As shown in FIG. 9a, the process 920 of comparing shown by FIG. 9b may be preceded by receiving at least one search term (step 910 of FIG. 9a) and followed by ranking and communicating a result based on the matches that are determined to exist (steps 925 and 930 of FIG. 9a). A more detailed description for steps 910, 925, and 930 is provided above with reference to FIG. 9a; a more detailed description of steps 922, 924, and 926 is provided below.

Classifying the search term (step 922) generally includes classifying the received search term among one or more categories, with a first category and a second category being described and shown for illustrative purposes. If several search terms are grouped as a single string, the search terms may be collectively classified as a single string based on the grouping of the search terms, or they may be classified individually based on each individual search term.

Comparing the search terms (step 924) generally includes comparing the search term to first electronic information within a first electronic information store when the search term is classified within the first category. By contrast, comparing the search term (step 926) generally includes comparing the search term to the second electronic information within the second electronic information store to determine whether matches exist when the search term is classified within the second category. However, comparing the search term (step 926) may also include comparing the search term to the first electronic information within the first information store such that matching results from both electronic information stores may result from the comparison (step 926). In this instance, search terms are compared to a first set of data (step 924), and compared to a second set of data that includes the first set of data and other data (step 926).

Figure 9C:
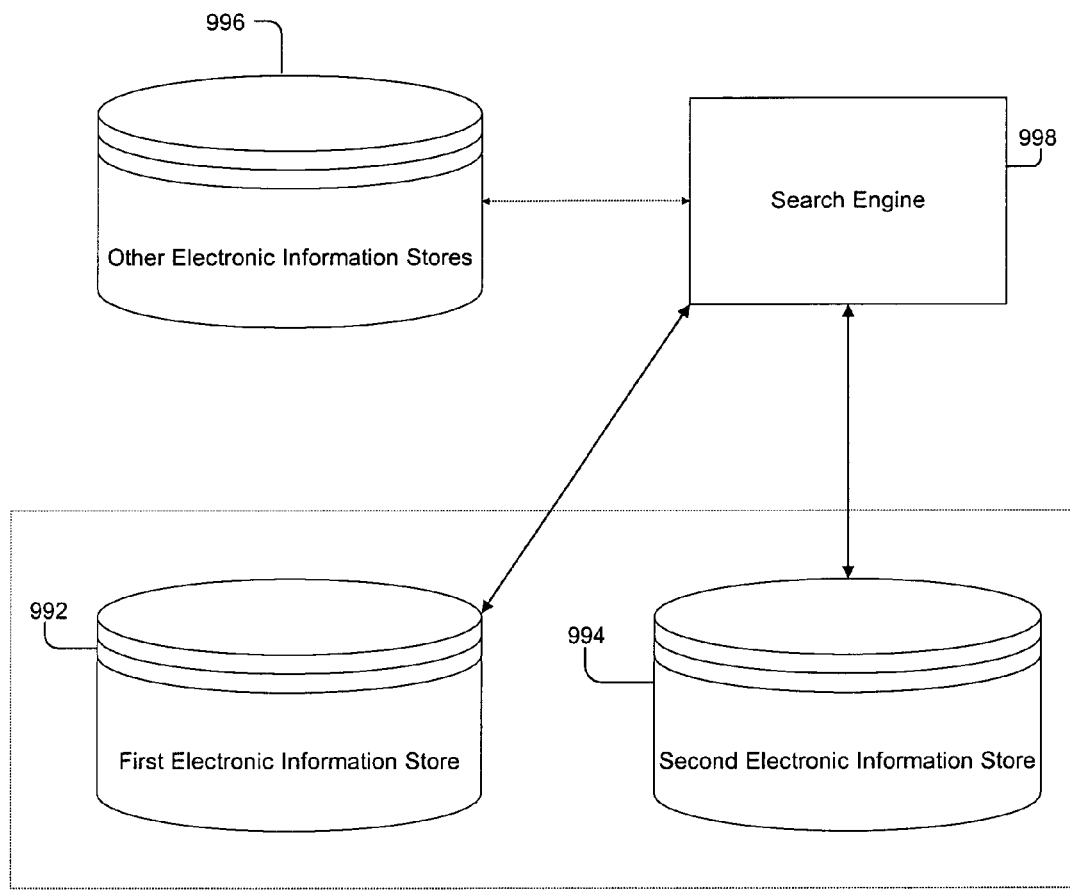
FIG. 9*c* is a block diagram of a system for storing searchable content.

Referring to FIG. 9c, a system that searches and stores searchable content includes first and second electronic information stores 992 and 994 which store electronic information received or derived from different sources which may have different classifications. The system may further include additional electronic information stores as illustrated by item 996, and generally may include a search engine 998 for comparing received search terms with the content within either or both information stores to determine whether matches exist.

The first electronic information store 992 and the second electronic information store 994 may be a part of a single storage device or several separate storage devices, examples of which include a magnetic disk (e.g., an internal hard disk and removable disk); a magneto-optical or optical disk; and a CD-ROM. The first electronic information store 992 and the second electronic information store 994 also or alternatively may be a part of a single volatile or non-volatile memory device or several separate non-volatile memory devices, examples of which include semiconductor memory devices such as RAM, ROM, PROM, EPROM, EEPROM, and flash memory devices. When stored on separate devices, the first electronic information store may be located on a first server and the second electronic information device may be located on a second server that differs from the first server.

The first and second electronic information stores 992 and 994 each may include partial or full text or other searchable content displayed by one or more different web pages from one or more different web sites, and may include identifiers for those web sites, such as titles, descriptions, and addresses. The first and second electronic information stores 992 and 994 are typically populated by automatically scanning and storing the text and/or other searchable content of a web site that has been accessed a threshold number of times by members of a web host as described with respect to steps 940, 945, and 950 of FIG. 9d, or that has been identified by a listing service (but not accessed the threshold number of times by members of the web host) as described with respect to steps 960, 970, and 980 of FIG. 9d. However, either of stores 992 and 994 may be populated in other ways. In either case, the first and second electronic information stores 992 and 994 store searchable content corresponding to the contents scanned from web pages, whether identified through access activities, list service identification, or in other ways.

Each electronic information store may contain content that has been classified and stored based on a specified type or types of classification criteria. For instance, the first electronic information store 992 may include content classified as non-offensive and the second electronic information store 994 may include content classified as offensive. Other types of content classification criteria may be implemented in addition to or separate from criteria based on offensive and non-offensive classifications. Other criteria that may be used, for example, include medical and non-medical, legal and non-legal, and sports and non-sports.

In one implementation, the first electronic information includes contents relating to non-offensive web sites, and the second electronic information includes contents relating to offensive web sites. Example of non-offensive web sites may include web sites that do not include pornographic, violent, racist, or hate-related content. By contrast, examples of offensive web sites may include web sites that include pornographic, violent, racist, or hate-related content.

The following describes an example applying the described search methods of FIG. 9b to this implementation. A user of a client system enters a search term (step 910). The search term is classified as either being offensive or non-offensive (step 922). If the term is classified as being non-offensive, then only the contents of the first electronic information store are searched (step 924) and results from the search are communicated for display to the user (step 930). In this example, the first electronic information store only contains contents that previously have been classified as non-offensive. If the search term entered by the user is classified as being offensive, the contents of either the second electronic information store or both the first and second electronic information stores are searched (step 926) and the results are communicated for display to the user (step 930).

The described filtering of results between offensive content and non-offensive content based on the classification of the search term may allow a web host to implement a parental type of control in determining what search results are displayed to the user. Because the offensive and non-offensive contents are stored in different electronic information stores, the ability to restrict access is enhanced. For instance, parental control can be exercised by blocking the access of a user to one or more electronic information stores. Other forms of data filtering also are enabled through this process and related techniques.

Figure 9D:
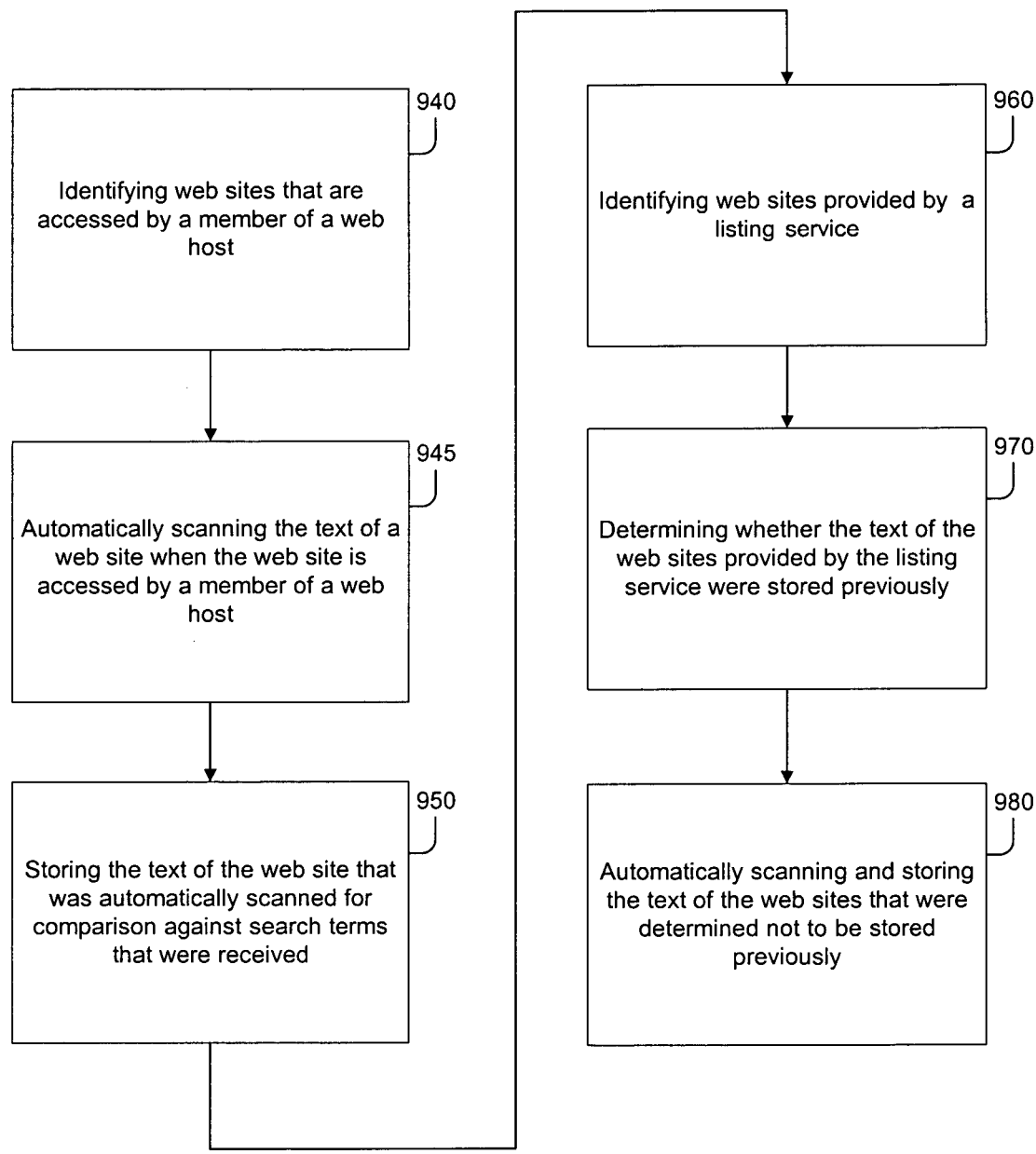
FIG. 9*d* is a flowchart of a process for populating electronic information stores.

Referring to FIG. 9d, the electronic information within the electronic information store may be populated by various methods. For instance, process 750 of FIGS. 7 and 9a also may include identifying web sites and/or web pages accessed by members of a web host (step 940), automatically scanning the text of a web site when the web site is accessed by a member of a web host (step 945), storing text or other searchable content from within the web site that was automatically scanned for comparison against search terms that were received (step 950), identifying web sites provided by a listing service (step 960), determining whether text or other searchable content for web sites identified by the listing service were stored previously (step 970), and automatically scanning and storing text or other searchable content from within web sites that were determined not to be stored previously (step 980). The relative order of steps within FIGS. 9a and 9d should not be construed to imply order among the steps described by those respective figures.

The access activity of members of a web host may be monitored to enable web sites that have been accessed to be identified for scanning and storage in preparation for future electronic searches (step 940).

Automatically scanning (step 945) typically includes automatically scanning the text of a web site when the web site is accessed by a member or a configurable threshold number of members of the web host. Automatically scanning also may include scanning the full text of the web site, scanning text included on an introductory page, and scanning full text included on an introductory page. Scanning generally includes character or image recognition techniques, but may include other methods of capturing and conversion of information displayed by accessed web pages or web sites to searchable form.

Storing text (step 950) generally includes storing the text or other searchable content of the web site that was automatically scanned for future comparison against search terms. The text may be stored in an electronic information store such as those described above, which may be embodied, for example, by cache memory.

In one implementation, prior to scanning (step 945) and storing (step 950), populating the electronic information store may further include identifying the web site being accessed by a member of the web host (step 940) and determining whether the text of the web site was previously stored. In this implementation, automatically scanning and storing will occur when the text of the web site is determined not to have been previously stored. Otherwise, the scanning and storing may be skipped.

Determining whether the text of the web site has been stored may be accomplished using various methods. For example, determining whether the text of the web site has been stored may be based on a web site address that corresponds to the web site being accessed by the member of the web host. Additionally or alternatively, determining whether the text has been stored may be based on the text of the web page or on the web site itself.

Another method for populating the electronic information within the electronic information store includes identifying web sites provided by a listing service (step 960), determining whether the text of the web sites provided by the listing service were scanned and stored previously (step 970), and automatically scanning and storing the text of the web sites determined not to be stored previously (step 980).

Identifying web sites provided by a listing service (step 960) may occur on a periodic basis (e.g., daily, weekly, monthly), based on a triggering event (e.g., receipt of listing service information), or otherwise. The listing service generally includes a third party service such as that provided by the Open Directory Project (ODP).

Determining whether web site content has been previously scanned and stored (step 970) may include searching memory or storage contents for content or identifiers corresponding to the web page or web host, either through a search of a table of contents for the memory or storage, or through a search of the memory or storage itself.

Automatically scanning and storing (step 980) also may include automatically scanning and storing the full text of web sites provided by the listing service.

The process for searching different data stores may further include automatically scanning contents of a web site when the web site is accessed by a member of a web host, classifying the contents of the web site among at least one of the first electronic information within the first electronic information store and the second electronic information within the second electronic information store, storing the contents of the web site as part of the first electronic information when the contents are classified among the first electronic information and storing the contents as part of the second electronic information when the contents of the web site are classified among the second electronic information.

Displaying Web Site Search Results

Figure 10A:
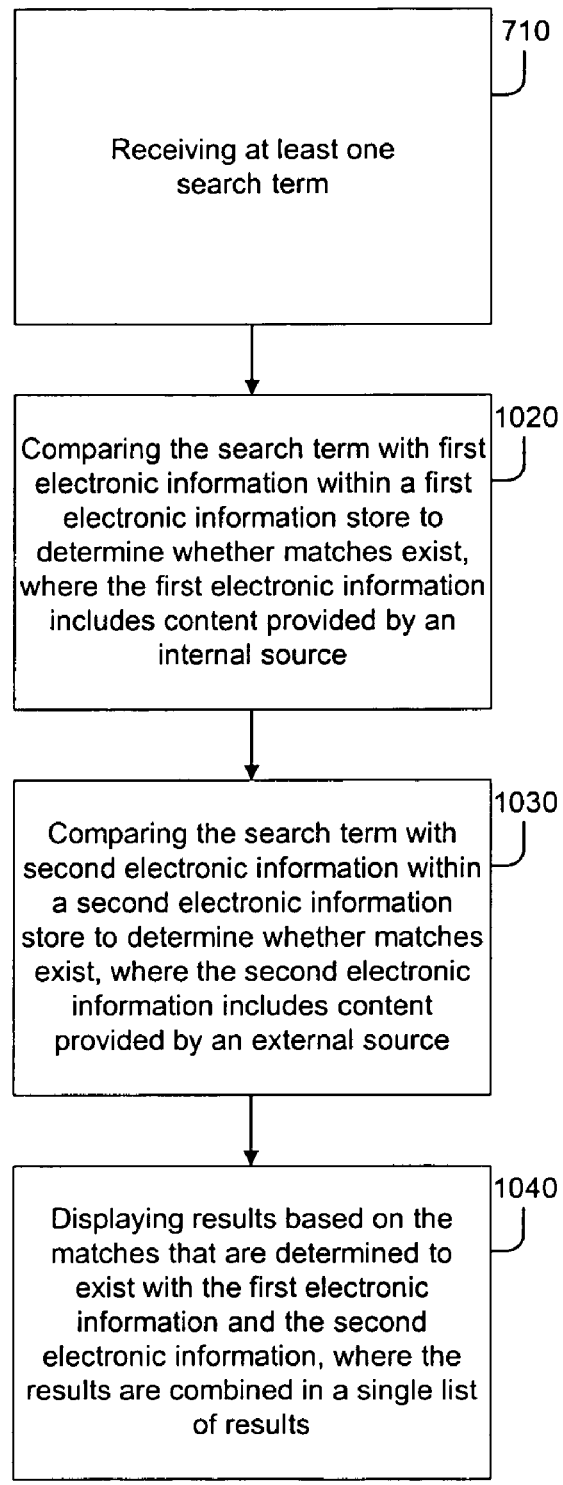
FIG. 10*a* is a flowchart of a process for displaying search results as part of the process of FIG. 7.

Referring to FIG. 10*a*, a process 780 for displaying web site search results generally includes receiving at least one search term (step 710). The search term is compared with first electronic information within a first electronic information store including content provided by an internal source to determine whether matches exist (step 1020). The search term also is compared with second electronic information within a second electronic information store including content provided by an external source to determine whether matches exist (step 1030). Results based on the matches that are determined to exist with the first electronic information and the second electronic information are displayed, with the results combined in a single list of results including the matches that are determined to exist with the first electronic information and the second electronic information (step 1040).

Typically, at least one search term is received (step 710). However, several search terms may be received and may be grouped by default as a single string, or may be grouped in other ways. The search terms may be received from any type of source (e.g., a user of a client system, a search engine, a component of a process for searching the Internet).

Comparing with first electronic information (step 1020) typically includes comparing the search term to first electronic information within a first electronic information store to determine whether matches exist. The first electronic information may include content provided and/or maintained by a web searching host, and content for which access is provided only to selected members by the web searching host. The web searching host may be an Internet service provider or some other content maintaining and providing service. The content may include content that is proprietary to the web searching host and content that is proprietary to another entity, but that is made accessible only to members of the web searching host.

Comparing with second electronic information (step 1030) typically includes comparing the search term to second electronic information within a second electronic information store to determine whether matches exist. The second electronic information may include content provided and/or maintained by a source external to the web searching host. One example of second electronic information includes content that is available to both members and non-members of a web searching host, such as content available to any member of the public on the World Wide Web. The content may include content that is non-proprietary to the web host as well as content that is proprietary to another entity, but that is available to others as well as to members of the web host.

For instance, steps 1020 and 1030 may correspond to searching processes described with respect to one or more of steps 720, 730, 740, and 750, where the web searching host searches its own content as well as externally provided and maintained content for matches with any or all of recommended sites, previously performed searches, category identifiers, and electronic information such as text from the web pages. An example of a web searching host includes America Online (AOL), which maintains web-accessible contents and which enables searching of those web-accessible contents and other non-AOL maintained contents, with display of amalgamated search results.

Results may be displayed (step 1040) based on the matches that are determined to exist with the first electronic information and the second electronic information. The results may be combined in a single list of results. Displaying (step 1040) may include displaying results such that the source of the results obtained from the external source or the web searching host is transparent to a user viewing the single list of results. Furthermore, the single list of results may be displayed in a ranked list of results. The ranking may be in descending order of relevance from results that are most relevant to the received search term to results that are least relevant to the received search term. Each result may be assigned a relevance weighting based on the numerous factors that may be considered by a ranking algorithm. Some of the factors used by the ranking algorithm may include the number of shared words between the search term and the results, and the identification of the component of a single result (e.g., title of the web site, description of the web site, address of the web site, text of the web site) in which the shared terms occur. Additionally or alternatively, the results may be ranked according to whether the match occurs between the search term and the internal source or between the search term and the external source.

For example, as shown in FIG. 9*e* under "Matching Sites", a single ranked list of results is displayed so that the source of any one listed result is transparent to a viewer of the results. Similarly, as shown in FIG. 10c under "Matching Web Pages", a single ranked list of results is displayed so that the source of any one listed result is transparent to a viewer of the results. A viewer of the results is unaware of the proprietary or non-proprietary nature of any of the results.

In one implementation, a process for displaying web site search results that are produced from searching multiple electronic information stores generally includes sending the search term to a third party search service for use in comparing the search term to at least second electronic information within a second electronic information store, receiving the results from the third party search service, combining the first results and the second results, and displaying the combined first results and second results as a single list of results, with the results including at least one web site identifier.

In this implementation, the first electronic information may include proprietary information and the second electronic information may include electronic information that is non-proprietary to a provider of the first electronic information. The second electronic information may be maintained by a third party search service and may include information that is proprietary to the third party search service. The first electronic information within the first electronic information store may be maintained by an Internet service provider.

In addition, the systems, methods, and techniques described here may be implemented in digital electronic circuitry, or in computer hardware, firmware, software, or in combinations of them. Apparatus embodying these techniques may include appropriate input and output components, a computer processor, and a computer program product tangibly embodied in a machine-readable storage component for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input component, and at least one output component. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage components suitable for tangibly embodying computer program instructions and data include all forms of non-volatile memory, including by way of example semiconductor memory components, such as Erasable Programmable Read-Only Memory (EPROM), Electrically Erasable Programmable Read-Only Memory (EEPROM), and flash memory components; magnetic disks such as internal hard disks and removable disks; magneto-optical disks; and Compact Disc Read-Only Memory (CD-ROM disks). Any of the foregoing may be supplemented by, or incorporated in, specially-designed ASICs (application-specific integrated circuits).

Accordingly, other embodiments are within the scope of the following claims.

What is claimed is:

1. A method for displaying web site search results obtained from searching multiple electronic information stores, the method comprising:
    storing, at a web host, internal searchable content accessible only to members of the web host;
    receiving at least one search term at the web host;
    comparing, at the web host, the search term with the stored internal searchable content accessible only to members of the web host to determine whether matches exist and obtaining an internal search result that is part of the stored internal searchable content accessible only to members of the web host;
    comparing the search term with electronic information that is external to the web host, that is distinct of the stored internal searchable content and that is accessible to both the members of the web host and non-members, to determine whether matches exist and obtaining an external search result that includes the matches that are determined to exist; and
    displaying, in a single interface, output that includes the internal search results and the external search results, wherein a group of more than one internal search result that includes the internal search result is displayed in a first section of the displayed output, a group of more than one external search result that includes the external search result is displayed in a second section of the displayed output, the first section and the second section are physically distinct from each other on the displayed output and the second section includes indication text indicating that the second section includes external search result.

2. The method of claim 1 wherein:
    receiving at least one search term comprises receiving several search terms and grouping the search terms received as a single string;
    comparing the search term with the first electronic information comprises comparing the single string of search terms with the first electronic information to determine whether matches exist; and
    comparing the search term with the second electronic information comprises comparing the single string of search terms with the second electronic information to determine whether matches exist.

3. The method of claim 1 wherein the first electronic information further includes proprietary web content such that comparing the search term with the first electronic information includes comparing the search term with the proprietary web content within the first electronic information store to determine whether matches exist.

4. The method of claim 3 wherein the second electronic information further includes non-proprietary web content such that comparing the search term with the second electronic information includes comparing the search term with the non-proprietary web content within the second electronic information store to determine whether matches exist.

5. The method of claim 1 wherein the output includes a ranked list of web site identifiers.

6. The method of claim 5 wherein the results from the matches determined to exist with the internal content from the web host are ranked higher than the results from the matches determined to exist with the content from the source other than the web host.

7. The method of claim 1 wherein indication text includes warning text.

8. A method for displaying web site search results that are produced from searching multiple electronic information stores, the method comprising:

- storing, at a web host, internal searchable content accessible only to members of the web host;
- receiving at least one search term at the web host;
- comparing, at the web host, the search term with the stored internal searchable content accessible only to members of the web host;
- obtaining an internal search result that is part of the stored internal searchable content accessible only to members of the web host, that includes the matches that are determined to exist;
- sending the search term to a third party search service for use in comparing the search term to at least electronic information that is external to the web host, that is distinct of the stored internal searchable content and that is accessible to both the members of the web host and non-members;
- receiving an external search results from the third party search service; and
- displaying, in a single interface, output that includes the internal search result and results, wherein a group of more than one internal search result that includes the internal search result is displayed in a first section of the displayed output, a group of more than one external search result that includes the external search result is displayed in a second section of the displayed output, the first section and the second section are physically distinct from each other on the displayed output, the results including at least one web site identifier and the second section includes indication text indicating that the second section includes external search result.

9. The method of claim 8 wherein the single interface of results is transparent as to a source of the results.

10. The method of claim 8 wherein the second electronic information within the second electronic information store is maintained by the third party search service.

11. The method of claim 8 wherein displaying the first results and the second results includes integrating the first results and the second results without displacing.

12. The method of claim 8 wherein the first electronic information includes proprietary information.

13. The method of claim 12 wherein the second electronic information includes information that is non-proprietary to a provider of the first electronic information.

14. The method of claim 13 wherein the second electronic information includes information that is proprietary to the third party search service.

15. The method of claim 8 wherein the first electronic information within the first electronic information store is maintained by an internet service provider.

16. The method of claim 8 wherein the output includes identifiers for several web sites, and displaying the results includes ranking identifiers for the several web sites.

17. The method of claim 8 wherein indication text includes warning text.

18. A computer program stored on a computer readable medium for displaying web site search results obtained from searching multiple electronic information stores transparently, comprising instructions for:

- storing, at a web host, internal searchable content accessible only to members of the web host;
- receiving at least one search term at the web host;
- comparing, at the web host, the search term the stored internal searchable content accessible only to members of the web host to determine whether matches exist, obtaining an internal search result that is part of the stored internal searchable content accessible only to members of the web host;
- comparing the search term with electronic information that is external to the web host, that is distinct of the stored internal searchable content and that is accessible to both the members of the web host and non-members to determine whether matches exist and obtaining an external search result that includes the matches that are determined to exist; and
- displaying, in a single interfaces, results that includes the internal search results and the external search results-wherein a group of more than one internal search result that includes the internal search result is displayed in a first section of the displayed output, a group of more than one external search result that includes the external search result is displayed in a second section of the displayed output, the first section and the second section are physically distinct from each other on the displayed output and the second section includes indication text indicating that the second section includes external search result.

19. The computer program of claim 18 wherein displaying results includes displaying results such that whether the results are obtained from the source other than the web host or the web host is transparent to a user viewing the single interface of results.

20. The computer program of claim 18 wherein indication text includes warning text.

* * * * *

UNITED STATES PATENT AND TRADEMARK OFFICE
CERTIFICATE OF CORRECTION

PATENT NO. : 7,359,951 B2 Page 1 of 1
APPLICATION NO. : 09/749627
DATED : April 15, 2008
INVENTOR(S) : Thomas E. Donaldson, Surendra Goel and David E. Kellum It is certified that error appears in the above-identified patent and that said Letters Patent is hereby corrected as shown below:

Column 26, line 16
In Claim 18, after "term" insert --with--.

Column 26, line 25
In Claim 18, after "non-members" insert --,--.

Column 26, line 29
In Claim 18, delete "interfaces," and insert --interface--.

Signed and Sealed this

Twenty-sixth Day of August, 2008

JON W. DUDAS
*Director of the United States Patent and Trademark Office*